United States Patent
Oh et al.

(10) Patent No.: US 8,327,001 B2
(45) Date of Patent: Dec. 4, 2012

(54) SYSTEM AND METHOD FOR THE SOLICITATION OF PRESENCE INFORMATION FROM PRESENCE SOURCE

(75) Inventors: Jae-Kwon Oh, Seoul (KR); Wuk Kim, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/349,081

(22) Filed: Jan. 12, 2012

(65) Prior Publication Data

US 2012/0117255 A1 May 10, 2012

Related U.S. Application Data

(63) Continuation of application No. 12/593,533, filed on Sep. 28, 2009, now abandoned.

(30) Foreign Application Priority Data

Mar. 29, 2007 (KR) .................. 10-2007-0031186

(51) Int. Cl.
G06F 15/16 (2006.01)
G06F 15/173 (2006.01)
G06F 15/177 (2006.01)
(52) U.S. Cl. ......... 709/228; 709/203; 709/217; 709/223
(58) Field of Classification Search .......... 709/217–228, 709/200–203
See application file for complete search history.

(56) References Cited

U.S. PATENT DOCUMENTS

| 7,184,415 B2 | 2/2007 | Chaney | |
|---|---|---|---|
| 7,280,502 B2 * | 10/2007 | Allen et al. | 370/329 |
| 7,676,548 B2 * | 3/2010 | Oh et al. | 709/208 |
| 7,738,894 B2 * | 6/2010 | Sung et al. | 455/518 |
| 7,774,011 B2 * | 8/2010 | Sung et al. | 455/518 |
| 7,813,747 B2 * | 10/2010 | Allen et al. | 455/518 |
| 2003/0108000 A1 | 6/2003 | Chaney et al. | |
| 2005/0083904 A1 | 4/2005 | Khartabil et al. | |
| 2005/0141479 A1 | 6/2005 | Ozugur et al. | |
| 2005/0255811 A1 * | 11/2005 | Allen et al. | 455/78 |

(Continued)

FOREIGN PATENT DOCUMENTS

WO    WO 03/034672    4/2003

OTHER PUBLICATIONS

3rd Generation Partnership Project; Technical Specification Group Services and System Aspects; Presence Service; Architecture and Functional Description (Release 7), 3GPP TS 23.141, V7.2.0, Sep. 1, 2006, pp. 1-36.

(Continued)

*Primary Examiner* — Haresh N Patel
(74) *Attorney, Agent, or Firm* — The Farrell Law Firm, P.C.

(57) ABSTRACT

A method for requesting presence information from a presence source by a presence server is provided. The method includes receiving, from a presence source, media feature tag value corresponding to presence information published by the presence source, respectively; requesting specific presence information from the presence source using a specific media feature tag value from among the media feature tag values; transmitting a publication rule for controlling publication operation of the presence source; and receiving, from the presence source, the specific presence information published by the presence source, according to the publication rule. Each of the media feature tag value represents a type of presence information published by the presence source.

15 Claims, 13 Drawing Sheets

U.S. PATENT DOCUMENTS

| | | | |
|---|---|---|---|
| 2006/0229095 A1* | 10/2006 | Sung et al. ............... 455/518 |
| 2006/0239247 A1 | 10/2006 | Postmus |
| 2007/0021138 A1* | 1/2007 | Allen et al. ............... 455/518 |
| 2007/0043872 A1* | 2/2007 | Pattan et al. .............. 709/227 |
| 2007/0121526 A1* | 5/2007 | Sung et al. ............... 370/252 |
| 2007/0135106 A1* | 6/2007 | Sung et al. ............. 455/414.1 |
| 2007/0168424 A1* | 7/2007 | Oh et al. .................. 709/204 |
| 2007/0182541 A1* | 8/2007 | Harris et al. ............. 340/506 |
| 2007/0184867 A1* | 8/2007 | Son et al. .................. 455/518 |
| 2007/0238478 A1* | 10/2007 | Sung ........................ 455/518 |
| 2007/0270104 A1* | 11/2007 | Allen et al. ................. 455/78 |
| 2008/0126541 A1* | 5/2008 | Rosenberg et al. ........ 709/225 |
| 2008/0228929 A1* | 9/2008 | Kiss ......................... 709/228 |
| 2008/0233935 A1* | 9/2008 | Garg ........................ 455/417 |
| 2010/0216501 A1* | 8/2010 | Sung et al. ............... 455/518 |

OTHER PUBLICATIONS

Rosenberg et al.: "Indicating User Agent Capabilities in the Session Initiation Protocol (SIP)" RFC 3840, Aug. 1, 2004 pp. 1-31.

* cited by examiner

```
REGISTER sip:example.com SIP/2.0
From: sip:brian@example.com;tag=asd98
To: sip:brian@example.com
Call-ID: hh89as0d-asd88jkk@host.example.com
Cseq: 9987 REGISTER
Max-Forwards: 70
Via: SIP/2.0/UDP location-server.example.com;branch=z9hG4bKnashds8
Contact: <sip:brian@example.com>;+g.presence.publish="location"
Content-Length: 0
```

FIG.5

```
REFER sip:brian@example.com SIP/2.0
Via: SIP/2.0/UDP agenta.atlanta.example.com;branch=z9hG4bK2293940223
To: <sip:brian@example.com>
Accept-Contact: *;+g.presence.publish="location";require;explicit
From: <sip:brian@example.com>;tag=193402342
Call-ID: 898234234@agenta.atlanta.example.com
Cseq: 93809823 REFER
Max-Forwards: 70
Refer-To: <sip:brian@example.com;method=PUBLISH>
Refer-Sub: false
Contact: sip:presence-server@example.com
Content-Length: 0
```

```
REFER sip:brian@example.com SIP/2.0
Via: SIP/2.0/UDP agenta.atlanta.example.com;branch=z9hG4bK2293940223
To: <sip:brian@example.com>
Accept-Contact: *;+g.presence.publish="location";require;explicit
From: <sip:brian@example.com>;tag=193402342
Call-ID: 898234234@agenta.atlanta.example.com
Cseq: 93809823 REFER
Max-Forwards: 70
Refer-To: <sip:brian@example.com;method=PUBLISH>
Refer-Sub: false
Contact: sip:presence-server@example.com
Content-Type: application/publication-rule+xml
Content-Length: ...

<?xml version="1.0" encoding="UTF-8"?>
<publication_rule xmlns="urn:oma:params:xml:ns:publish-rules">
    <trigger method="periodic">10</trigger>
    <valid till="2007-12-04T08:00:00+09:00"/>
</publication_rule>
```

FIG.7B

```
REFER sip:brian@example.com SIP/2.0
Via: SIP/2.0/UDP agenta.atlanta.example.com;branch=z9hG4bK2293940223
To: <sip:brian@example.com>
Accept-Contact: *;+g.presence.publish="location";require;explicit
From: <sip:brian@example.com>;tag=193402342
Call-ID: 898234234@agenta.atlanta.example.com
Cseq: 93809823 MESSAGE
Max-Forwards: 70
Refer-To: <sip:brian@example.com;method=PUBLISH>
Refer-Sub: false
Contact: sip:presence-server@example.com
Content-Type: application/publication-rule+xml
Content-Length: ...

<?xml version="1.0" encoding="UTF-8"?>
<publication_rule xmlns="urn:oma:params:xml:ns:publish-rules">
    <trigger method="new"/>
    <valid/>
</publication_rule>
```

FIG.7C

```
REFER sip:brian@example.com SIP/2.0
Via: SIP/2.0/UDP agenta.atlanta.example.com;branch=z9hG4bK2293940223
To: <sip:brian@example.com>
Accept-Contact: *;+g.presence.publish="location";require;explicit
From: <sip:brian@example.com>;tag=193402342
Call-ID: 898234234@agenta.atlanta.example.com
Cseq: 93809823 REFER
Max-Forwards: 70
Refer-To: <sip:brian@example.com;method=PUBLISH>
Refer-Sub: false
Contact: sip:presence-server@example.com
Content-Type: application/publication-rule+xml
Content-Length: ...

<?xml version="1.0" encoding="UTF-8"?>
<publication_rule xmlns="urn:oma:params:xml:ns:publish-rules">
    <cancel/>
</publication_rule>
```

```
MESSAGE sip:brian@example.com SIP/2.0
Via: SIP/2.0/UDP agenta.atlanta.example.com;branch=z9hG4bK2293940223
To: <sip:brian@example.com>
Accept-Contact: *;+g.presence.publish="location";require;explicit
From: <sip:brian@example.com>;tag=193402342
Call-ID: 898234234@agenta.atlanta.example.com
Cseq: 93809823 MESSAGE
Max-Forwards: 70
Contact: sip:presence-server@example.com
Content-Type: application/publication-rule+xml
Content-Length: ...

<?xml version="1.0" encoding="UTF-8"?>
<publication_rule xmlns="urn:oma:params:xml:ns:publish-rules">
    <trigger method="current"/>
</publication_rule>
```

FIG.8A

```
PUBLISH sip:brian@example.com SIP/2.0
Via: SIP/2.0/UDP agenta.atlanta.example.com;branch=z9hG4bK2293940223
To: <sip:brian@example.com>
Accept-Contact: *;+g.presence.publish="location";require;explicit
From: <sip:brian@example.com>;tag=193402342
Call-ID: 898234234@agenta.atlanta.example.com
Cseq: 93809823 PUBLISH
Max-Forwards: 70
Contact: sip:presence-server@example.com
Content-Length: ...

<?xml version="1.0" encoding="UTF-8"?>
<publication_rule xmlns="urn:oma:params:xml:ns:publish-rules">
    <trigger method="current"/>
</publication_rule>
```

FIG.8B

```
SUBSCRIBE sip:brian@example.com SIP/2.0
Via: SIP/2.0/UDP watcher.example.com;branch=z9hG4bK2293940241
To: <sip:brian@example.com>
From: <sip:brian@example.com>;tag=193402342
Call-ID: 32432udfidfjmk342
Cseq: 1 SUBSCRIBE
Expires: 3600
Event: Presence
Contact: <sip:watcher@client.example.com>
Content-Type: application/simple-filter+xml
Content-Length: ...

<?xml version="1.0" encoding="UTF-8"?>
<filter-set xmlns="urn:ietf:params:xml:ns:simple-filter"
      xmlns:ext="urn:oma:params:xml:ns:notification-rules">
  <ns-bindings>
   <ns-binding prefix="pidf" urn="urn:ietf:params:xml:ns:pidf"/>
   <ns-binding prefix="omalocation" urn="urn:oma:params:xml:ns:location"/>
  </ns-bindings>
   <filter id="123" uri="sip:brian@example.com">
    <what>
     <include type="xpath">
       /pidf:presence/pidf:person/omalocation:location
     </include>
    </what>
    <trigger>
     <ext:periodic>10<ext:periodic/>
    </trigger>
   </filter>
</filter-set>
```

FIG.11

```
SUBSCRIBE sip:brian@example.com SIP/2.0
Via: SIP/2.0/UDP watcher. example.com;branch=z9hG4bK2293940241
To: <sip:brian@example.com>
From: <sip:brian@example.com>;tag=193402342
Call-ID: 32432udfidfjmk342
Cseq: 1 SUBSCRIBE
Expires: 3600
Event: Presence
Contact: <sip:watcher@client.example.com>
Content-Type: application/simple-filter+xml
Content-Length: ...

<?xml version="1.0" encoding="UTF-8"?>
<filter-set xmlns="urn:ietf:params:xml:ns:simple-filter"
      xmlns:ext="urn:oma:params:xml:ns:notification-rules">
  <ns-bindings>
   <ns-binding prefix="pidf" urn="urn:ietf:params:xml:ns:pidf"/>
   <ns-binding prefix="omalocation" urn="urn:oma:params:xml:ns:location"/>
  </ns-bindings>
  <filter id="123" uri="sip:brian@example.com">
   <what>
     <include type="xpath">
       /pidf:presence/pidf:person/omalocation:location
     </include>
   </what>
   <trigger>
     <ext:snapshot/>
   </trigger>
  </filter>
</filter-set>
```

SYSTEM AND METHOD FOR THE SOLICITATION OF PRESENCE INFORMATION FROM PRESENCE SOURCE

PRIORITY

This application is a Continuation of U.S. application Ser. No. 12/593,533, now abandoned, which was filed in the U.S. Patent and Trademark Office on Sep. 28, 2009, as a National Phase entry of International Application No. PCT/KR2008/001722, which was filed on Mar. 27, 2008, and claims priority under 35 U.S.C. §119(a) to Korean Patent Application Serial No. 10-2007-0031186, which was filed in the Korean Intellectual Property Office on Mar. 29, 2007, the content of each of which is incorporated herein by reference.

BACKGROUND OF THE INVENTION

1. Field of the Invention

The present invention relates to a system and a method for providing a presence service, and more particularly to a system and a method for directly requesting and receiving presence information from a presence source.

2. Description of the Related Art

In general, a presence service refers to a service for properly notifying a series of objects interested in a certain subject of concern, such as a user or a group, of information regarding a current state of communication of the subject, through a series of devices. Based on published state information about a subject of concern, the series of objects can understand a current situation of communication about the subject of concern, and can also select a communication means, which is optimized, i.e. has the highest probability of success, at a desired time so as to try to make contact with the subject of concern. At this time, a user which is a subject to be observed refers to a presentity, communication state about the user refers to presence information, and a user who receives the information refers to a watcher.

With reference to FIG. 1, a simplified architecture of a presence service is shown. A subject of concern in the presence service refers to a presentity, and presence sources 120 collect information regarding the presentity, i.e. presence information, and publishes the information to a presence server 110. The presence server 110 composes pieces of presence information, generates aggregated presence information about the presentity, and notifies objects interested in the presentity, i.e. watchers 100, of the aggregated presence information.

A signal flow between such functional entities of the presence server will be described with reference to FIG. 2.

Whenever presence information of a presentity is changed, the presence source 120 publishes changed presence information to the presence server 110 by using SIP (Session Initiation Protocol) PUBLISH, which is defined in "RFC3903 "SIP Extension for Event State Publication"", through a SIP/IP (Session Initiation Protocol/Internet Protocol) core 140. Then, the presence server 110 composes many pieces of presence information published from the presence source 120 into one piece of presence information so as to maintain the latest presence information about the presentity. Such a step where the presence source 120 publishes changed presence information to the presence server 110 by using SIP PUBLISH according to the change of presence information may be illustrated in steps 200, 203, 212, and 215.

Meanwhile, in a case where a watcher 100 requests presence information about a corresponding presentity from the presence server 110 according to presence event package defined in "RFC3856 "A Presence Event Package for the SIP"", the presence server 110 notifies the watcher 100 of the requested presence information by using SIP NOTIFY through SIP/IP core 140. Also, a step of notifying, by the presence server 110, the watcher 100 of presence information about a presentity by using SIP NOTIFY may be illustrated in steps 208 to 211.

Also, in a case where the presence source 120 publishes changed presence information to the presence server 110 by using SIP PUBLISH according to change of presence information in steps 212 to 215, the presence server 110 notifies the watcher 100 of the presence information by using SIP NOTIFY through steps 216 to 219. Particularly, the presence server 110 notifies the watcher 100 of the latest presence information by using SIP NOTIFY whenever presence information about a corresponding presentity is changed.

In the case of FIG. 2, the presence server 110 collects presence information about the presentity only when the presence source 120 publishes the presence information thereto. Particularly, collection of presence information about a presentity in the presence server 110 is entirely up to voluntary publication performed by the presence source 120.

In order to complement this, a method for allowing the presence server 110 to directly request information publication from the presence source 120 by using SIP REFER defined in "RFC3515 "The SIP REFER Method"".

As such, the flow of a signal for allowing the presence server 110 to directly request the presence source 120 to publish presence information will be described with reference to FIG. 3. Firstly, a step where the presence source 120 publishes changed presence information to the presence server 110 by the can be illustrated in steps 300 to 303.

Then, when the watcher 100 requests presence information about a corresponding presentity from the presence server 110 by using SIP SUBSCRIBE, the presence server 110 notifies the watcher 100 of the presence information about the presentity according to the request. A step of requesting presence information of a presentity and a step of publishing presence information according to the request may be illustrated in steps 304 to 311.

Meanwhile, the presence server 110 requests presence information from the presence source 120 by using SIP REFER. According to the request, the presence source 120 publishes the requested presence information to the presence server 110 by using SIP PUBLISH. Accordingly, the presence server 110 updates presence information about the corresponding presentity and notifies the watcher 100 of the presence information by using SIP NOTIFY. As such, a step where the presence server 110 directly requests presence information about a presentity from the presence source 120, and after receiving presence information, notifies the watcher 100 of the presence information will be described in the same manner as steps 312 to 323.

As described above, in the prior art, in order to improve a problem in that collection of presence information about a presentity in the presence server 110 has no choice but to be entirely up to voluntary publication performed by the presence source 120, such a manner that the presence server 110 directly requests presence information about a presentity from the presence source 120, receives the presence information, and notifies the watcher 100 of the presence information has been developed.

However, the prior art discloses only the fact that the presence server 110 directly requests presence information about a presentity from presence source 120, receives presence information, and notifies the watcher of the presence information as shown in FIG. 3. But, the prior art does not disclose how the presence server 110 identifies a specific presence source and routes SIP REFER requesting presence information about a corresponding presentity to a corresponding presence source 120 through the SIP/IP core 140.

Also, in the above described method as shown in FIG. 3, only the fact that the presence server 110 requests presence information about a corresponding presentity from the presence source is described, and how the presence source 120 publishes the corresponding presence information is not described.

Also, in the method as shown in FIG. 3, where presence server 110 requests presence information from the presence source 120 is not described.

SUMMARY OF THE INVENTION

Accordingly, the present invention has been made to solve the above-mentioned problems occurring in the prior art, and the present invention provides a presence system and method for directly requesting and receiving presence information from a presence source.

In accordance with an aspect of the present invention, a method for requesting presence information from a presence source by a presence server is provided. The method includes receiving, from a presence source, media feature tag value corresponding to presence information published by the presence source, respectively; requesting specific presence information from the presence source using a specific media feature tag value from among the media feature tag values; transmitting a publication rule for controlling publication operation of the presence source; and receiving, from the presence source, the specific presence information published by the presence source, according to the publication rule. Each of the media feature tag value represents a type of presence information published by the presence source.

In accordance with another aspect of the present invention, a method for requesting presence information from a present source in a presence source is provided. The method includes previously registering, in a Session Initiation Protocol/Internet Protocol (SIP/IP) core, media feature tab values corresponding to each presence information element published by the presence source, respectively; receiving a request of specific presence information from the presence server, the request including a specific media feature tag value; receiving a publication rule for controlling publication operation of the presence source; and publishing, in accordance with the publication rule, the specific presence information corresponding to the specific media feature tag value. The media feature tag values represents a type of presence information published by the presence source.

BRIEF DESCRIPTION OF THE DRAWINGS

The above and other aspects, features, and advantages of the present invention will be more apparent from the following detailed description taken in conjunction with the accompanying drawings, in which:

The above and other aspects, features and advantages of the present invention will be more apparent from the following detailed description taken in conjunction with the accompanying drawings, in which:

FIG. 5 is a view illustrating a message format used when a presence source registers presence information publication capability thereof according to an embodiment of the present invention;

FIG. 6 is a view illustrating a message format used when a presence server requests presence information from presence source according to an embodiment of the present invention;

FIGS. 7a to 7c are views illustrating a message format used when a presence server requests presence information from a presence source, and also requests a publication rule about presence information of the presence source according to an embodiment of the present invention;

FIGS. 8a and 8b are views illustrating a SIP message format and a SIP PUBLISH format, which are used when a presence server requests presence information from a presence source according to an embodiment of the present invention;

FIG. 11 is a view illustrating a message format used when the watcher requests the presence server to periodically notify the watcher of presence information as shown in FIG. 10 according to an embodiment of the present invention;

FIG. 13 is a view illustrating a message format used when the watcher requests the presence server to notify the watcher of the snapshot of presence information as shown in FIG. 12.

DETAILED DESCRIPTION OF EMBODIMENTS OF THE INVENTION

The present invention provides a scheme for making it possible that a presence server identifies a specific presence source and performs SIP routing to an identified presence source. Also, according to the present invention, a presence source previously registers its own presence information publication capability in a SIP/IP core by using a media feature tag suggested in the present invention according to a method described in "RFC3840 "Indicating User Agent Capabilities in the SIP"". The presence server allows a media feature tag suggested in the present invention to be included a accept-contact SIP header by using a method described in "RFC3841 "Caller Preferences for the SIP"", so that the presence server suggests that SIP REFER for requesting a specific presence information be routed to a presence source in charge of publication of a corresponding presence information through the SIP/IP core.

Figure 1:
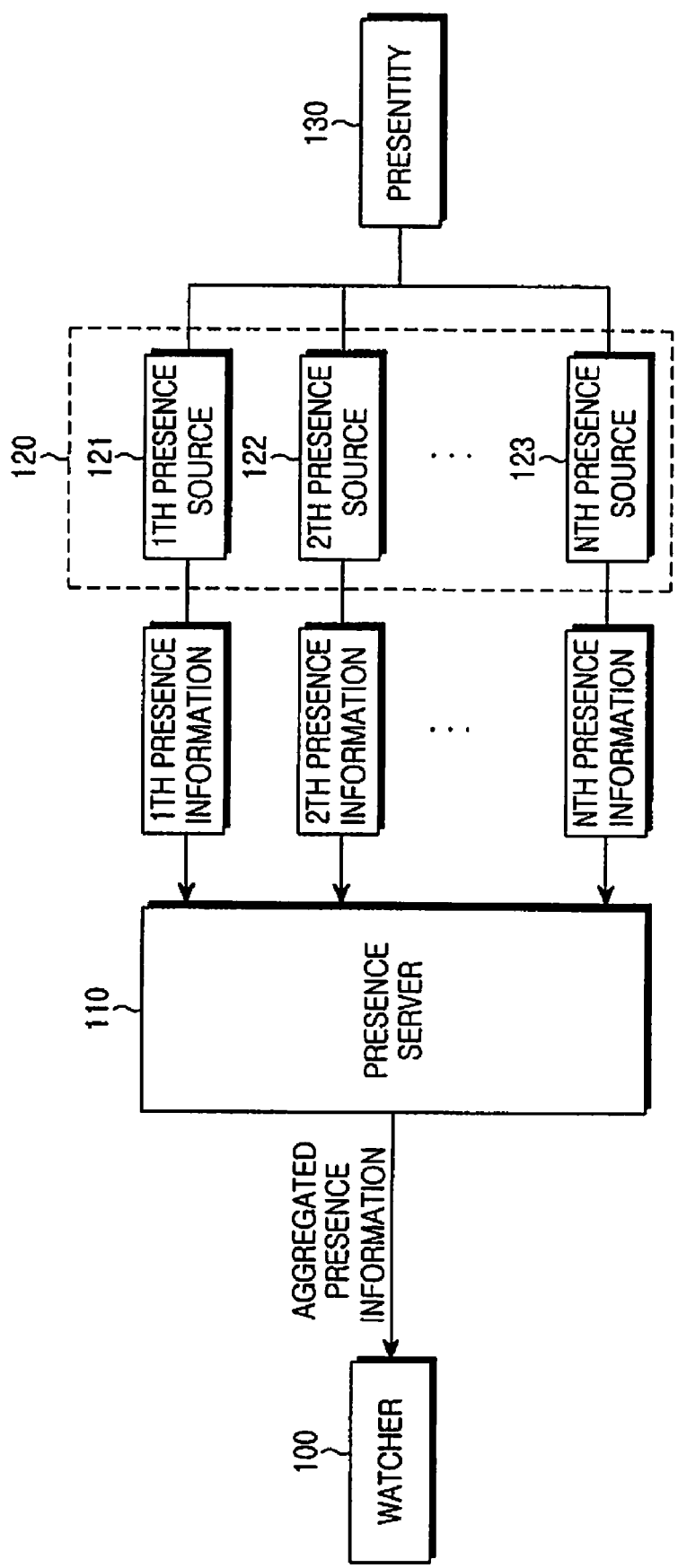
FIG. 1 is a view illustrating an architecture implementing a typical presence service.
Figure 2:
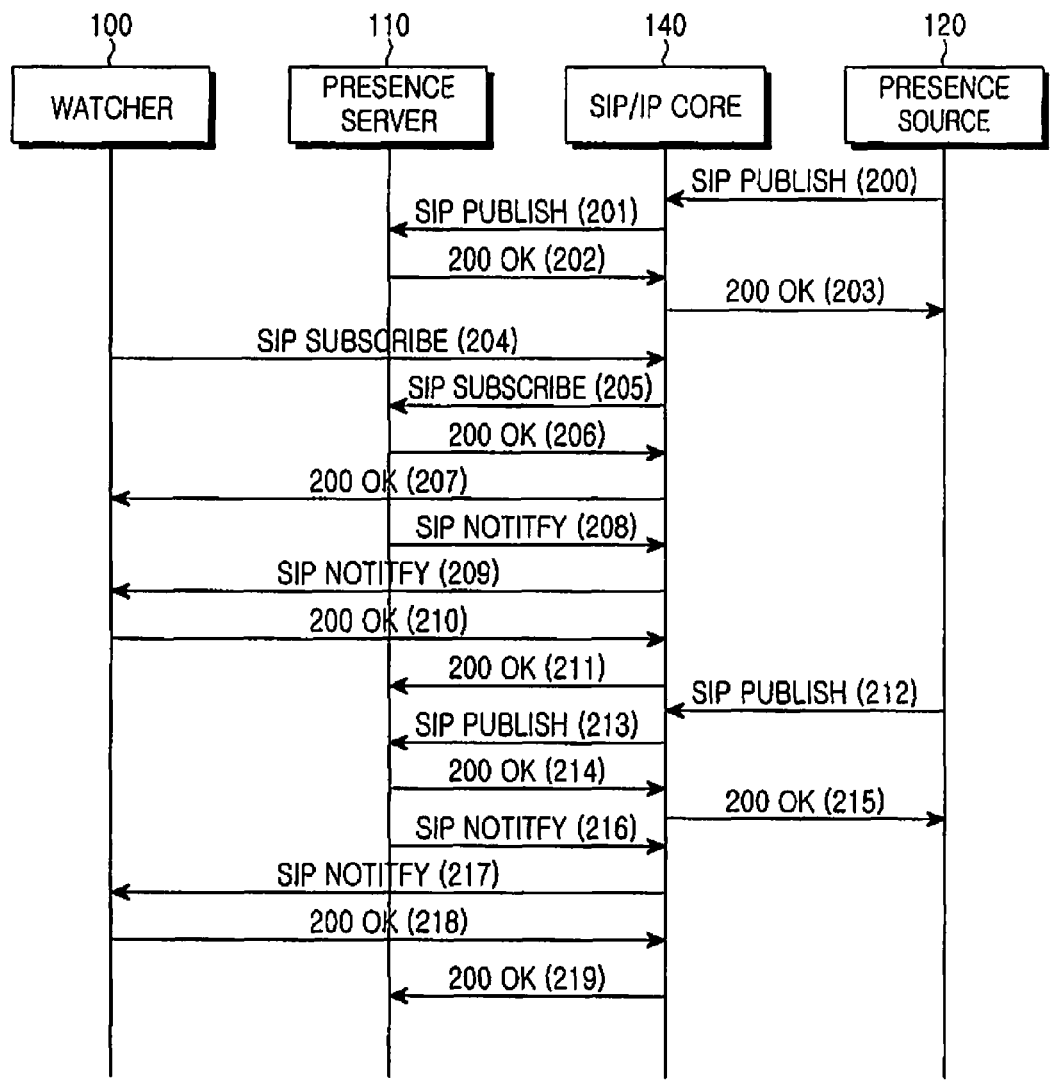
FIG. 2 is a flow chart of a signal for requesting and providing typical presence information.
Figure 3:
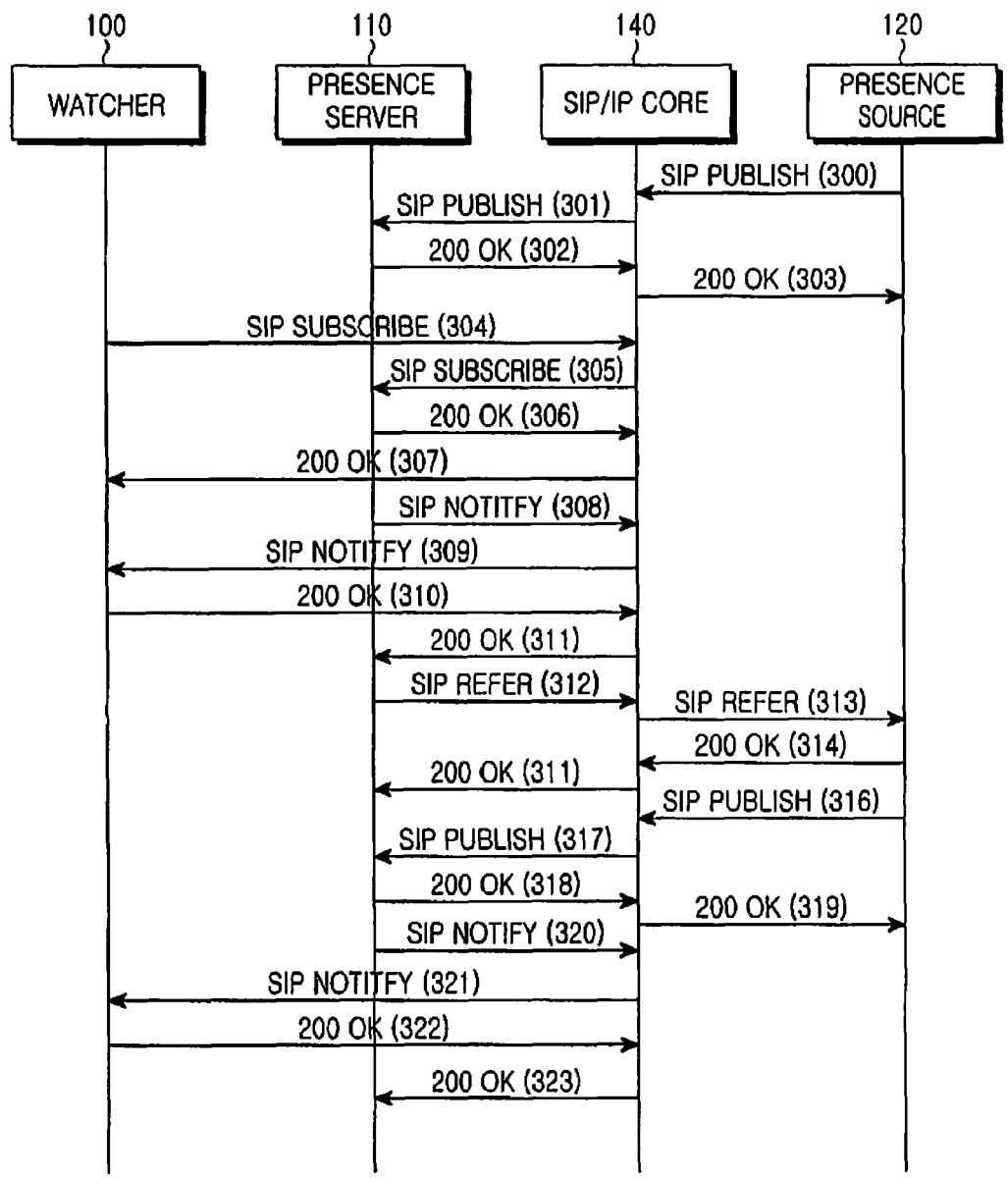
FIG. 3 is a flow chart illustrating a procedure where a conventional presence server requesting presence information from a presence source.
Figure 4:
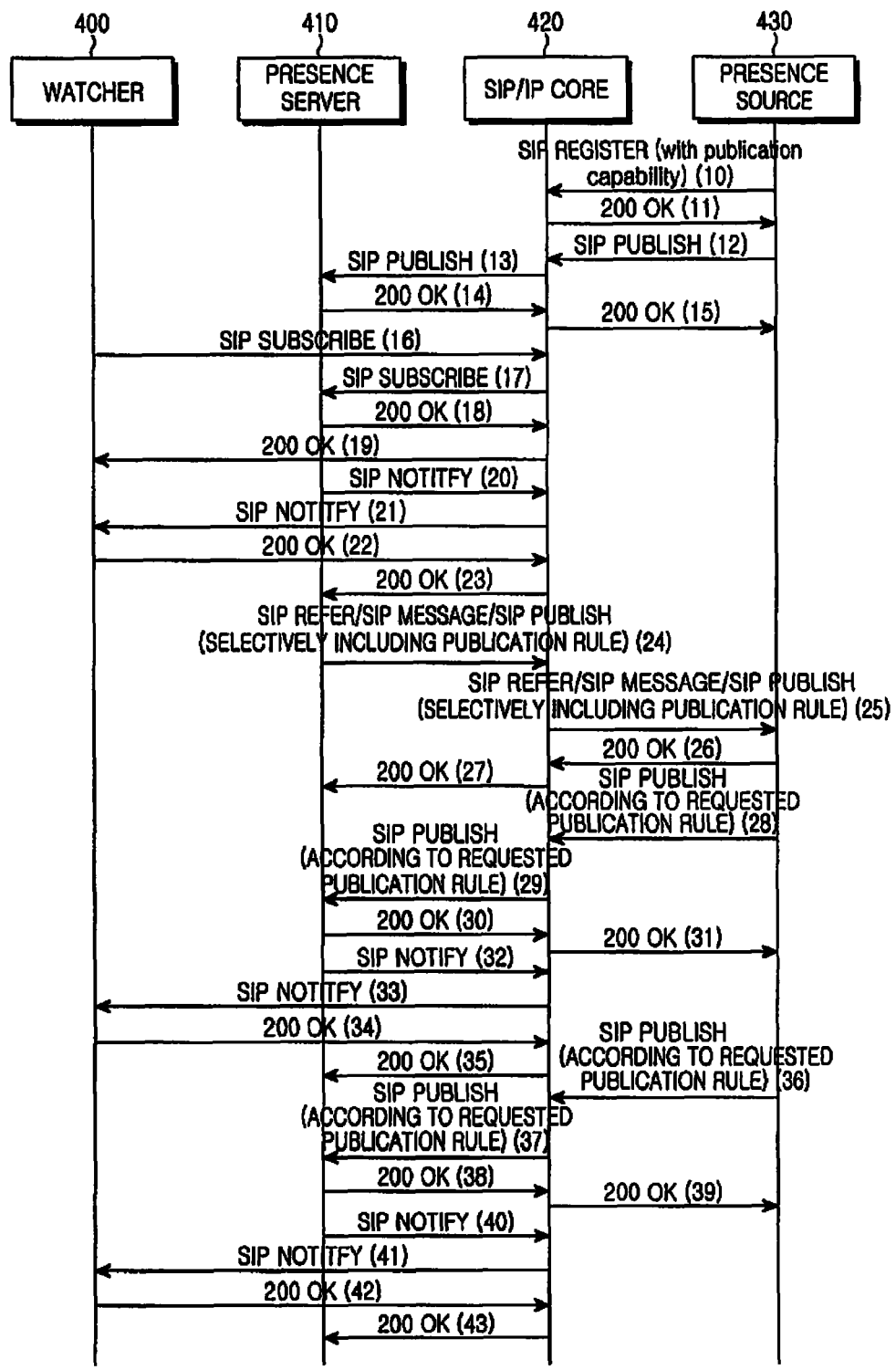
FIG. 4 is a flow chart of improved signals for allowing a presence server to request presence information from a presence source and for regulating the way the presence source publishing presence information according to an embodiment of the present invention.

FIG. 4 is a signal flow showings a procedure where the present server requests presence information from the presence source according to an embodiment of the present invention.

The present invention suggests that a new media feature tag for showing presence information publication capability of the presence source 430 be used according to "RFC3840 "Indicating User Agent Capabilities in the SIP"". Also, in the present invention, the new media feature tag is named as "+g.presence.publish". Also, in the present invention, the presence source 430 arrays presence information elements which can be published by using the value of such a media feature tag so that the presence source 430 suggests that its own presence information publication capability be registered in the SIP/IP core 420.

Particularly, pieces of presence information, which can be published, are constituted of presence information elements and correspond to each media feature tag value so as to be registered in the SIP/IP core 420.

The presence source 430, which has its own presence information publication capability registered in the SIP/IP core 420, shows a request for presence information from the presence server 410 can be processed by a media feature tag having a name equal to "+g.presence.publish", and shows which kind of presence information elements can be published by media feature values tag having a name equal to "+g.presence.publish". As such, it can be performed through steps 10 and 11 that the presence source 430 registers presence information publication capability in the SIP/IP core 420 by using a media feature tag.

For example, FIG. 5 shows an example of a message for registering a capability, of which the presence source 430 capable of publishing location information can publish presence information about the location of a presentity addressed "sip:brian@example.com", in the SIP/IP core 420 by means of a method suggested in the present invention.

Meanwhile, through steps 12 to 15, the presence source 430 publishes changed presence information to the presence server 410 through the SIP/IP core 420 according to the change of presence information. Then, when the watcher 400 requests presence information about a corresponding presentity from the presence server 410 by means of SIP SUBSCRIBE through steps 16 to 23, the presence server 410 notifies the watcher 400 of presence information about the corresponding presentity through the SIP/IP core 420 according to the request.

Also, in the present invention, it is suggested that request for specific presence information about a specific presentity be published to the presence source 430 in charge of publication of presence information by using an accept-contact SIP header defined in "RFC3840 "Indicating User Agent Capabilities in the SIP"". Particularly, the presence server 410 requests presence information in such a manner that a media feature tag, such as the above defined "+g.presence.publish", and the kind of presence information to be requested, are clearly described as the value of the accept-contact SIP header so that the presence server 410 allows the SIP/IP core 420 to publish the request to the present source 430 which can accomplish it. It can be performed in steps 24 to 27 that specific presence information about a specific presentity is requested.

For example, FIG. 6 shows an example of a message used when the presence server 410 requests presence information about the location of a presentity addressed "sip:brian@example.com" in such a manner the presence server 410 allows ""*;+g.presence.publish="location";require;explicit" to be included in the accept-contact SIP header suggested in the present invention of SIP REFER.

Then, the SIP/IP core 420, which has received the SIP REFER, which is a message for requesting presence information about a specific presentity as shown in FIG. 6, performs publication of presence information about the location of the presentity addressed "sip:brian@example.com" with a reference described in the accept-contact SIP header, and identifies the presence source, in which presence information publication capability is registered as described above, and publishes corresponding SIP REFER to the presence source 430. In FIG. 6, "require" and "explicit" are used in a matching rule described in "RFC3840 "Indicating User Agent Capabilities in the SIP"", and shows the fact that only the presence source, in which presence information publication capability of "+g.presence.publish="location"" has been registered, will be matched so as to be identified. Also, according to the preference of the presence server 410, other kinds of matching rules described in "RFC3840 "Indicating User Agent Capabilities in the SIP"" can be used.

The presence source 430, to which the message for requesting presence information about the specific presentity has been published as described above, transmits the requested presence information to the presence server 410 by using SIP PUBLISH through the SIP/IP core 420. As such, it can be performed in steps 28 to 31 that the presence source 430 transmits the requested presence information to the presence server 410 by using the SIP PUBLISH.

As shown in steps 24 and 25 of FIG. 4, in the present invention, the presence server 410 suggests that it can publish a publication rule for controlling publication operation of the presence source 430 together with a request for presence information from the presence source 430. The presence source 430 suggests that presence information be published according to the requested publication rule.

Then, it is suggested that such a publication rule for controlling a request for presence information and publication operation of the presence source 430 may include contents as described below.

Firstly, it may be described when the presence source 430 publishes presence information about a corresponding presentity, i.e. whether the presence source 430 publishes presence information whenever a corresponding information is updated, whether the presence source 430 immediately publishes the presence state regardless of updating, or whether the presence source periodically publishes a corresponding information, etc. Also, in a case of periodical publication, it has to be described in which cycle the corresponding information is published.

Secondly, accuracy of presence information to be published may be described. For example, in a case of location information, it may be described in which degree of accuracy location information is published. For example, it may be described that location information is published accurately with a dimension of 100 m. Thirdly, it may be described until when a corresponding rule is valid.

The above-described contents can be included in a message for requesting for presence information so as to be transmitted. Also, if there is rule information for another kind of publication additionally to the above-described contents, corresponding information can be included according to necessity.

Also, such publication rules in a type of XML can be included in a body of a SIP request for presence information described above, and "application/publication-rule+xml" can be used as a MIME type of such a publication rule.

For example, with reference to FIGS. 7a to 7c, examples where a publication rule is described together with a request for presence information from the presence source 430 by using the above-described SIP REFER are shown.

Above all, FIG. 7a shows a message requesting the presence source 430, which publishes location information of the presentity addressed "sip:brian@example.com", to periodically publish a corresponding information per ten minutes until 08:00 UTC+9, Dec. 4, 2007. This message is described with the "10" value of a child element of a <publication_rule> root element, the "periodic" value of "method" attribute of a <trigger> child element, and the "2007-12-04T08:00+09:00" value of "till" attribute of a <valid> child element.

FIG. 7b shows a message requesting the presence source 430, which publishes location information of the "sip:brian@example.com" presentity, to publish corresponding information whenever new update occurs and for requesting continuous validity of such a rule. This message is described with the "new" value of "method" attribute of a <trigger> child element of a <publication_rule> root element and an empty <valid> child element.

Finally, FIG. 7c shows a message requesting the presence source 430, which publishes location information of the "sip:brian@example.com" presentity, to cancel all existing publication rules regarding presence information about "sip:brian@example.com" presentity. This is described with an empty <cancel> element of a <publication_rule> root element. If the presence source 430 receives such a message shown in FIG. 7c, the presence source 430 deletes all existing publication rules and then publishes presence information according to a default publication rule which has been previously set. In most cases, according to the default publication rule, which has been previously set, the presence source 430 publishes presence information whenever an update of presence information about a corresponding presentity occurs.

Also, in steps 24 and 25 of FIG. 4 according to the present invention, the presence server 410 suggests that when there is a request for presence information about a specific presentity from the presence source 430, it is possible to use a SIP MESSAGE defined in "RFC3428 "Session Initiation Protocol (SIP) Extension for Instant Messaging"" or SIP PUBLISH defined in "RFC3903 "Session Initiation Protocol (SIP) Extension for Event State Publication"" in addition to such SIP REFER.

If presence information is requested by using the SIP MESSAGE or the SIP PUBLISH, equally to the above-described SIP REFER, a routing technique is applied to the presence source 430 by using a media feature tag of the accept-contact SIP header. At this time, the above described publication rule is also described. There is a difference in comparison with the SIP REFER, in which a description of a publication rule is optional.

Above all, FIG. 8a shows an example of a SIP MESSAGE transmitted in a case where presence information is requested by using the SIP MESSAGE will be described. FIG. 8a shows a message for requesting the presence source 430, which publishes location information of "sip:brian@example.com" presentity, to publish present location information of the "sip:brian@example.com" presentity by using a SIP MESSAGE and a publication rule. This message is described with the "current" value of "method" attribute of the <trigger> child element of the <publication_rule> root element.

Then, with reference to FIG. 8b, an example of a SIP PUBLISH transmitted in a case where there is a request for presence information by using the SIP PUBLISH will be described below. FIG. 8b shows a message for requesting the presence source 430, which publishes location information of the "sip:brian@example.com" presentity, to publish present location information of the "sip:brian@example.com" presentity by using a SIP PUBLISH and a Publication Rule. This is described with the "current" value of "method" attribute of the <trigger> child element of the <publication_rule> root element.

As described above, in FIG. 4, the presence server 410 allows a publication rule regarding presence information to be included in a message for requesting presence information, and transmits the message to the presence source 430 through the SIP/IP core 420. As such, is can be triggered due to various situations that the presence server 410 suggested by the present invention requests presence information from the presence source 430.

In the present invention, among methods for triggering the operation of the presence server 410, which requests presence information from the presence source 430, a case where the watcher 400 requests the presence server 410 to notify presence information of a specific presentity according to a specific method is suggested. As an example of this, there may be a case where the watcher 400 requests the presence server 410 to periodically notify the watcher of presence information about a specific presentity, and a case where the watcher 400 requests the presence server 410 to notify the watcher of a present snapshot of the presence information about a specific presentity.

Figure 9:
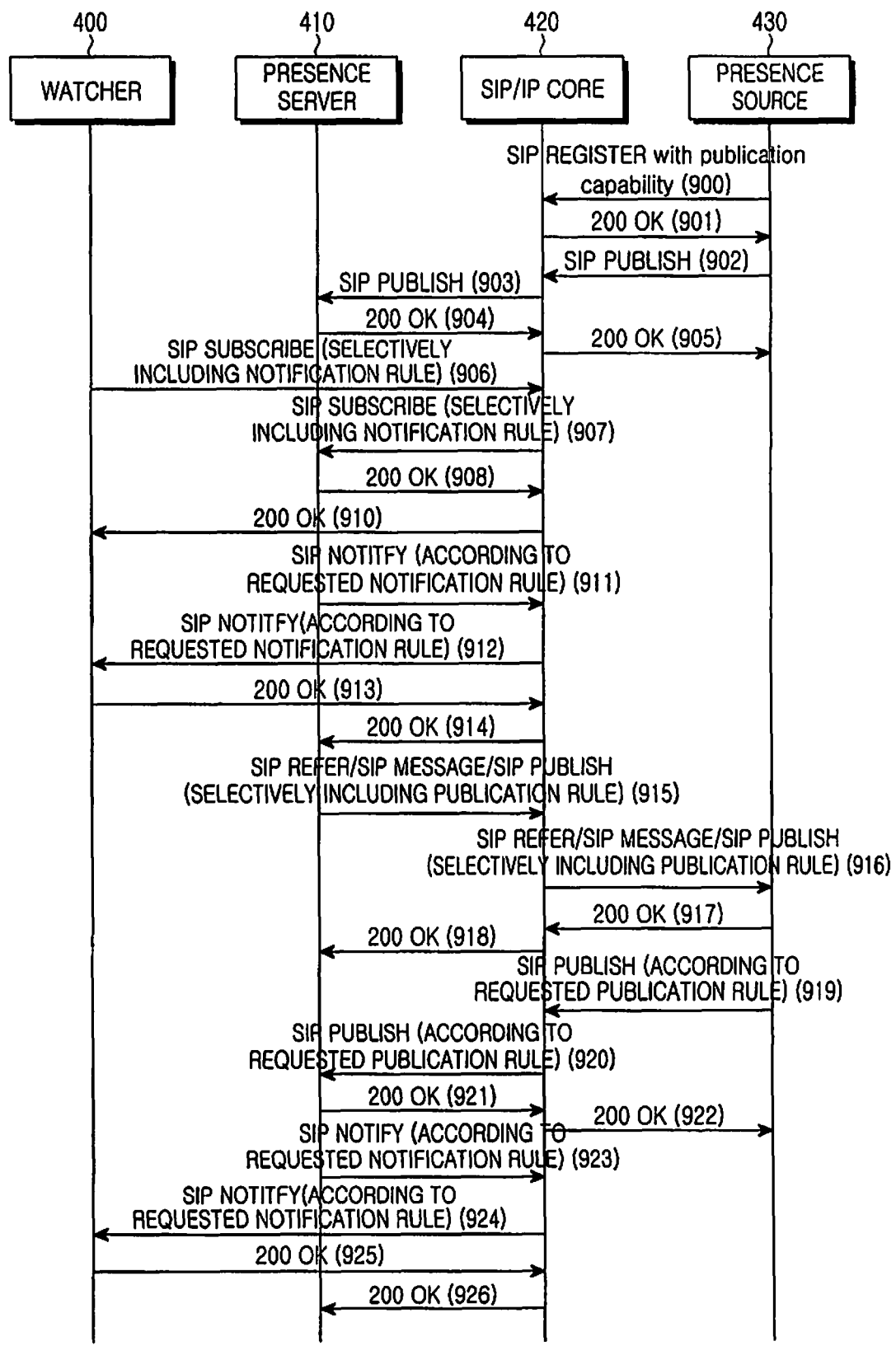
FIG. 9 is a view illustrating a procedure where a watcher requests a scheme for notifying presence information from a presence server according to an embodiment of the present invention.

Firstly, with reference to FIG. 9, it is suggested that the watcher 400 describes such a notification method as a notification rule, transmits it to the presence server 410, and requests it from the presence server 410.

Firstly, steps 900 and 911 are procedures equal to steps 10 and 11 in FIG. 4, in which the presence source 430 registers a presence information publication capability in the SIP/IP core 420 by using a media feature tag.

Also, steps 902 to 905 are procedures equal to steps 12 to 15 in FIG. 4, which are described above, in which the presence source 430 publishes presence information to the presence server 410 according to change of presence information.

In the present invention, in order to describe a notification rule, it is suggested that the watcher 400 expands filter description defined in "RFC4660 "Functional Description for Event Notification Filtering"" so as to use it. According to "RFC4660 "Functional Description for Event Notification Filtering"", the watcher 400 can describe that filter description is included when a present event package using SIP SUBSCRIBE is requested, and presence information of specific part described in "<what> element" of filter description is notified. Also, the watcher 400 can describe that corresponding presence information is notified to the watcher in a case how contents of presence information of a specific part was changed according to a method described in "<trigger> element" of filter description. In the present invention, it is suggested that through expansion of the "<trigger> element" of such filter description, the watcher 400 describes that the watcher 400 periodically requests a corresponding presence information, or requests a snapshot of the presence information, and this description is included in SIP SUBSCRIBE to be published to the presence server 410. Hereinafter, a case where the watcher 400 periodically requests corresponding presence information from the presence server 410, and the presence server 410 periodically requests presence information from the presence source 430, will be described with reference to FIG. 10. Also, a case where the watcher 400 requests the presence server 410 to notify a present snapshot, and the presence server 410 requests a snapshot from the presence source 430 will be described with reference to FIG. 12.

As such, a procedure where the watcher 400 allows information about a notification rule regarding the presence information notification to be included in a request when the watcher 400 requests presence information and transmits the request to the presence server 410 can be shown in steps 906 to 910. Also, the presence server 410 notifies the watcher 400 of presence information according to the notification rule requested through steps 911 to 914 and steps 923 to 926.

Then, according to the method described in steps 24 to 27 of FIG. 4, the presence server 410, which receives such a notification request from the watcher 400, can request the presence source 430 to publish a specific presence information according to the request by means of a method described in a publication rule. A procedure where the presence server 410 publishes SIP REFER, which is a message for requesting presence information, including a publication rule, and receives a corresponding response is the same manner as steps 915 to 918.

Then, the presence source 430 publishes a corresponding presence information to the presence server 410 according to the publication rule requested through steps 919 to 922.

After this, through steps 923 to 926, the presence source 430 notifies the watcher 400 of presence information received from the presence source 430 according to the notification rule.

Figure 10:
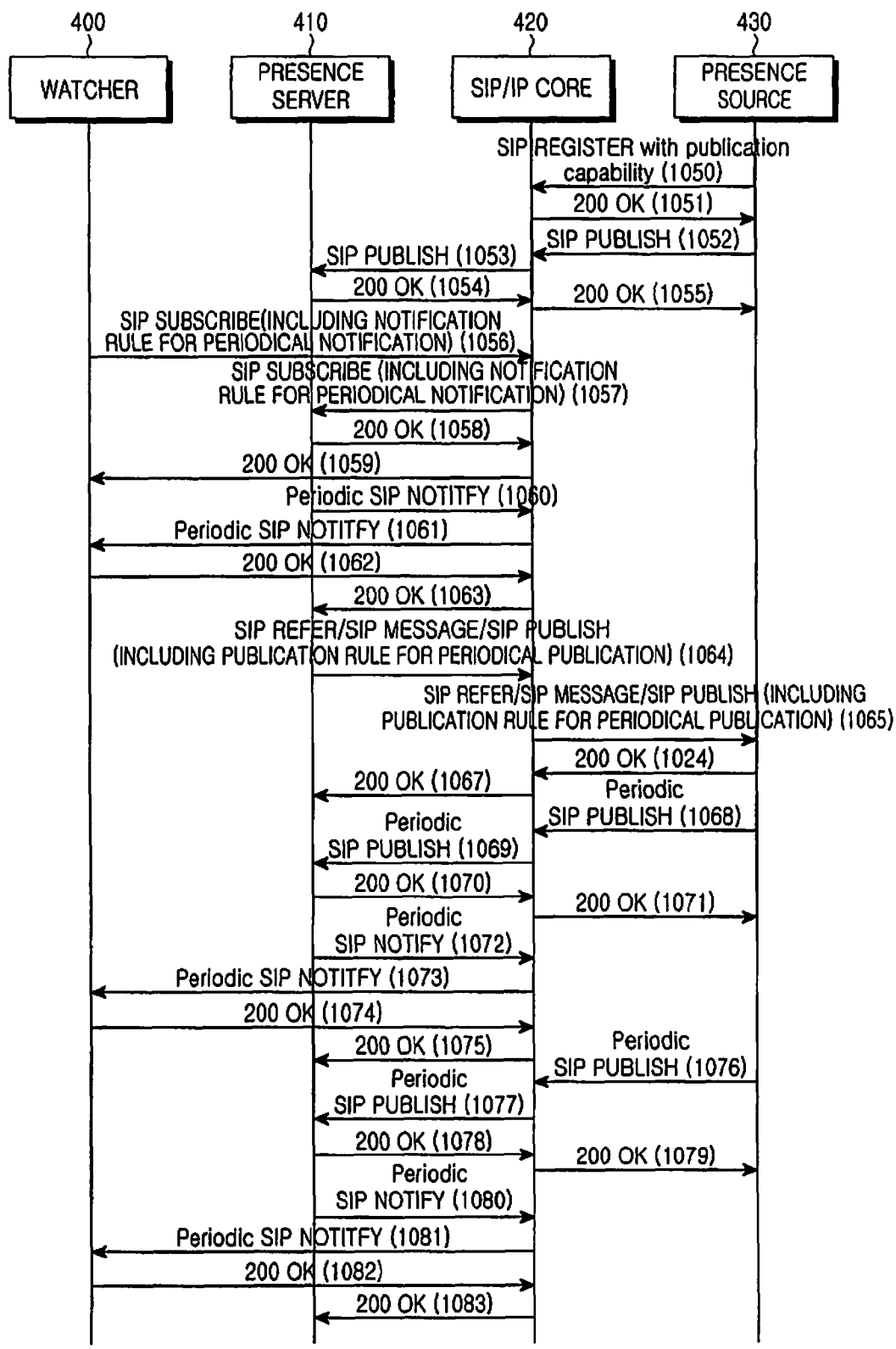
FIG. 10 is a view illustrating a procedure where a watcher requests a presence server to periodically notify the watcher of presence information according to an embodiment of the present invention.

Then, examples of signal flow and a message, which allow the watcher 400 to request that specific presence information be periodically notified to the watcher 400 by using filter description according to a method provided by the present invention, will be described with reference to FIGS. 10 and 11.

Firstly, steps 1050 and 1051 are procedures equal to steps 10 and 11 in FIG. 4, and are procedures where the presence source 430 registers presence information publication capability in the SIP/IP core 420 by using a media feature tag.

Also, steps 1052 to 1055 are procedures equal to steps 12 to 15 in FIG. 4, and are procedures where the presence source 430 publishes presence information to the presence server 410 according to the change of presence information.

After this, according to an embodiment of the present invention, the watcher 400 describes the fact that the watcher 400 periodically requests corresponding presence information by using a filter description, allows the description to be included in SIP SUBSCRIBE, and publishes the SIP SUBSCRIBE to the presence server 410. As such, a procedure for allowing notification rule information for periodical notification to be included in SIP SUBSCRIBE for requesting presence information, publishing the SIP SUBSCRIBE, and receiving a corresponding response, can be illustrated in the same manner as steps 1056 to 1059.

The presence server 410, which has received the SIP SUBSCRIBE, notifies the watcher 400 of initial presence information, which is currently noted in steps 1060 to 1063.

Also, the presence server 410, which has received such a request for periodical notification from the watcher, requests the presence source 430 to periodically publish specific information according to the request for periodical notification in such a manner that the request is included in a publication rule according to the method described in steps 24 to 27 in FIG. 4. A procedure where the presence server 410 publishes SIP REFER, which is a message for requesting presence information, including the periodical publication rule and receives a corresponding response, is the same as steps 1064 to 1067.

Then, according to such a request for periodical notification of presence information, the present source 430 publishes presence information to the presence server 410 in each corresponding period as shown in steps 1068 to 1071 and steps 1076 to 1079.

The presence server 410, which has received presence information in each corresponding period as described above, notifies the watcher 400 of the received presence information as shown in steps 1072 to 1075 and steps 1080 to 1083.

Then, an example of a message, which the watcher 400 publishes so as to request the presence server 410 to periodically notify the watcher of presence information in step 1056, will be described with reference to FIG. 11. A message shown in FIG. 11 is an example of a message used when the watcher 400 describes a request for notification of location information of the "sip:brian@example.com" presentity per ten minutes as a <periodic> element obtained by expanding a <trigger> element of filter description within the SIP SUBSCRIBE and the "10" value thereof, and requests the presence server 410 to notify the location information of the "sip:brian@example.com" presentity per ten minutes.

If the presence server 410 receives the SIP SUBSCRIBE shown in FIG. 11, the presence server 410 requests the presence source 430 to publish location information of the "sip:brian@example.com" presentity per ten minutes according to the request of the watcher 400 by means of a method provided by the present invention.

Then, a corresponding presence source 430 publishes location information of the "sip:brian@example.com" presentity per ten minutes to the presence server 410 according to the request of the presence server 410, and the presence server 410 notifies the watcher 400 of the location information.

Then, examples of signal flows and messages, which allow the watcher 400 to request notification of a snapshot of specific presence information by using a filter description according to a method suggested by the present invention, will be described with reference to FIGS. 12 and 13.

Firstly, steps 1200 and 1201 are equal to steps 10 and 11 in FIG. 4 and are procedures where the present source 430 registers presence information publication capability in the SIP/IP core 420 by using a media feature tag.

Also, steps 1202 to 1205 are equal to steps 12 to 15 in FIG. 4 and are procedures where the presence source 430 publishes presence information to the presence server 410 according to change of the presence information.

After this, according to an embodiment of the present invention, the watcher 400 describes a request for notification of a snapshot of corresponding present information, i.e. a present state, and the description is included in SIP SUBSCRIBE so as to be published to the presence server 410. As such, a procedure for allowing notification rule information for requesting notification of a snapshot of present presence information to be included in SIP SUBSCRIBE for requesting presence information, publishing the SIP SUBSCRIBE, and receiving a corresponding response can be shown in steps 1206 to 1209.

Then, as shown in the method described in steps 24 to 27 in FIG. 4, the present server 410, which has received such a request for notification of a snapshot from the watcher 400, requests the presence source 430 to publish current snapshot of a specific presence information according to the request by means of a method described in a publication rule.

A procedure where the presence server 410 publishes SIP REFER, which is message for requesting presence information including a publication rule about a snapshot, and receives a corresponding response is the same as steps 1201 to 1213.

Then, the presence source 430 publishes a current snapshot of presence information to the presence server 410 according to the publication rule as shown steps 1214 and 1217.

After this, the presence server 410 notifies the watcher 400 of the published current snapshot of presence information through steps 1218 to 1221.

Now, an example of a message, which the watcher 400 publishes so as to request the presence server 410 to publish the current snapshot of presence information, will be described with reference to FIG. 13. A message shown in FIG. 13 is an example of a message used when the watcher 400 describes a request for notification of current location information of the "sip:brian@example.com" presentity as a <snapshot> element obtained by expanding a <trigger> element of a filter description within SIP SUBSCRIBE and requests the presence server 410 to notify the current location information.

If the presence server 410 receives the SIP SUBSCRIBE shown in FIG. 13, the presence server 410 requests the presence source 430 to publish current location information of the "sip:brian@example.com" presentity according to the request of the watcher 400 by means of a method provided by the present invention.

Then, a corresponding presence source 430 publishes current location information of the "sip:brian@example.com" presentity to the presence server 410 according to the request of the presence server 410, and the presence server 410 notifies the watcher 400 of the current location information of the "sip:brian@example.com" presentity.

Figure 12:
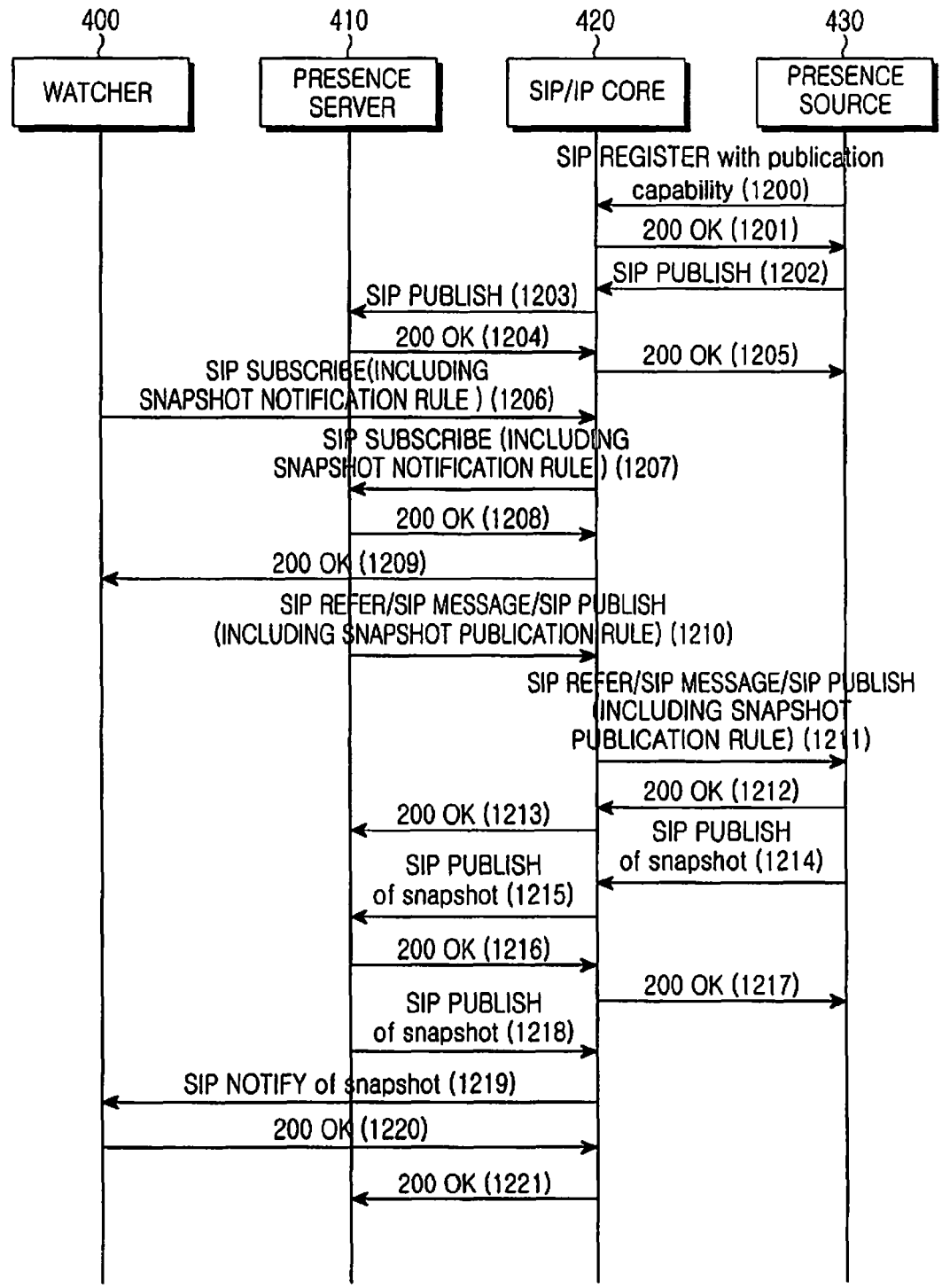
FIG. 12 is a view illustrating a procedure where a watcher requests a presence server to notify a watcher of a snapshot of presence information according to an embodiment of the present invention.

In FIG. 12 according to an embodiment of the present invention, in accordance with a SIP SUBSCRIBE request of the watcher 400 regarding a snapshot, the presence server 410 receives a snapshot of a corresponding presence information from the presence source 430 and notifies the watcher 400 of a result obtained by the snapshot rather than directly notifying the watcher 400 of presence information that the presence server 410 has recognized.

However, as described in "[RFC3856 "A Presence Event Package for the SIP", it is possible that the presence server 410 directly notifies presence information, which the presence server 410 has recognized, in accordance with a SIP SUBSCRIBE request of the watcher 400 regarding a snapshot, and also receives a snapshot of a corresponding presence information from the presence source 430 so that the presence server 410 can additionally notify the watcher 400 of a result obtained by the snapshot.

According to the present invention, the presence server can directly receives presence information from the presence source in an active manner, and the presence server can control the publication operation of the presence source. Also, the watcher can actively request desired presence information and a method for notifying the watcher of the presence information.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for requesting presence information in a presence source, the method comprising the steps of:
   previously registering, in a Session Initiation Protocol/Internet Protocol (SIP/IP) core, media feature tag values corresponding to each presence information element published by the presence source, respectively;
   receiving a request of specific presence information from a presence server, the request including a specific media feature tag value;
   receiving a publication rule for controlling publication operation of the presence source; and
   publishing, in accordance with the publication rule, the specific presence information corresponding to the specific media feature tag value,
   wherein each of the media feature tag values represents a type of presence information published by the presence source.

2. The method as claimed in claim 1, further comprising:
   storing presence information about a presentity; and
   previously registering corresponding media feature tag values corresponding to the presence information publication capability in the SIP/IP core.

3. The method as claimed in claim 1, wherein the publication rule describes at least one of that the presence source publishes presence information about the corresponding presentity, whether the presence source publishes presence information whenever corresponding information is updated, whether the presence source immediately publishes a present state regardless of updating, or in which period the presence source publishes corresponding information, or describes at least one of accuracy of presence information to be published or until when a corresponding rule is valid.

4. The method as claimed in claim 1, wherein the request for the specific presence information includes at least one publication rule corresponding to each of the specific presence information.

5. The method as claimed in claim 1, wherein the publication rule describes that all existing publication rules of the presence source are cancelled.

6. The method as claimed in claim 1, wherein the message for requesting presence information includes one of SIP REFER, SIP MESSAGE, and SIP PUBLISH.

7. A method for requesting presence information from a presence source by a presence server, the method comprising the steps of:
   receiving, from the presence source, media feature tag values corresponding to presence information published by the presence source, respectively;
   requesting specific presence information from the presence source using a specific media feature tag value from among the media feature tag values;
   transmitting a publication rule for controlling publication operation of the presence source; and
   receiving, from the presence source, the specific presence information published by the presence source, according to the publication rule,
   wherein each of the media feature tag values represents a type of presence information published by the presence source.

8. The method as claimed in claim 7, wherein requesting presence information includes at least one publication rule corresponding to each type of the specific presence information.

9. The method as claimed in claim 7, wherein the requesting the specific presence information comprises:
   authorizing a publication rule that indicates a scheme for publishing the presence information to be selectively included in a message for requesting the specific presence information; and
   transmitting the message.

10. The method as claimed in claim 7, wherein the publication rule describes at least one of when the presence source publishes presence information about presentity, whether the presence source publishes the presence information whenever corresponding information is updated, whether the presence source immediately publishes a present state regardless of updating, or in which period the presence source publishes corresponding information, or describes at least one of accuracy of the presence information to be published or until when a corresponding rule is valid.

11. The method as claimed in claim 7, where the publication rule describes that all existing publication rules of the presence source are cancelled.

12. The method as claimed in claim 7, wherein the message for requesting presence information includes one of SIP REFER, SIP MESSAGE, and SIP PUBLISH.

13. The method as claimed in claim 7, further comprising the steps of:
   receiving a message for requesting presence information, which includes a notification rule, from a watcher; and
   transmitting the message for requesting the presence information, which includes the publication rule allowing the presence source to publish the presence information according to the notification rule, to the presence source when the request for the specific presence information and the notification rule regarding the presence information from the watcher are received.

14. The method as claimed in claim 13, wherein the notification rule describes at least a scheme for notifying corresponding presence information in a predetermined period or a scheme for notifying a current snapshot of corresponding presence information.

15. The method as claimed in claim 13, further comprising:
   requesting presence information from the presence source, after receiving a request for specific presence information and the notification rule regarding the presence information from the watcher; and
   transmitting a message for requesting presence information, which includes the publication rule showing a requested notification scheme.

\* \* \* \* \*